(12) United States Patent
Tsuruoka

(10) Patent No.: US 6,192,056 B1
(45) Date of Patent: Feb. 20, 2001

(54) DEMODULATING APPARATUS AND DEMODULATING METHOD

(75) Inventor: Tatsuya Tsuruoka, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/071,935

(22) Filed: May 4, 1998

(30) Foreign Application Priority Data

May 12, 1997 (JP) .................................................. 9-120962

(51) Int. Cl.[7] ...................................................... H04J 3/06
(52) U.S. Cl. .......................... 370/504; 370/504; 370/208
(58) Field of Search ................................... 370/204, 208, 370/210, 255, 324, 343, 465, 504, 512, 519, 336; 455/23; 375/343, 324, 130

(56) References Cited

U.S. PATENT DOCUMENTS 5,608,764 * 3/1997 Sugita et al. .......................... 375/344
5,732,068 * 3/1998 Takahashi et al. ................... 370/206
6,009,073 * 12/1999 Kaneko ................................. 370/203
6,021,165 * 2/2000 Ohkubo et al. ....................... 375/344

* cited by examiner

*Primary Examiner*—Hassan Kizou
*Assistant Examiner*—Duc Ho
(74) *Attorney, Agent, or Firm*—Jay H. Maioli

(57) ABSTRACT

A demodulating apparatus and a demodulating method includes a correlation detector for detecting a correlation between a guard section of the symbol of a digital orthogonal frequency division multiplex modulated signal and a section having a correlation with the guard section in an effective symbol of the symbol, a section integrator for section integrating a detected output of the correlation detector with respect to the guard section, a peak detector for detecting a peak of a triangular wave signal from the section integrator, and a frame timing signal producing circuit for producing a frame timing signal of a predetermined frame of each of the frames based on a peak detecting signal from the peak detector. The frame synchronizing signal generator circuit may be made synchronized by a frame timing signal from the frame timing signal producing circuit.

4 Claims, 5 Drawing Sheets

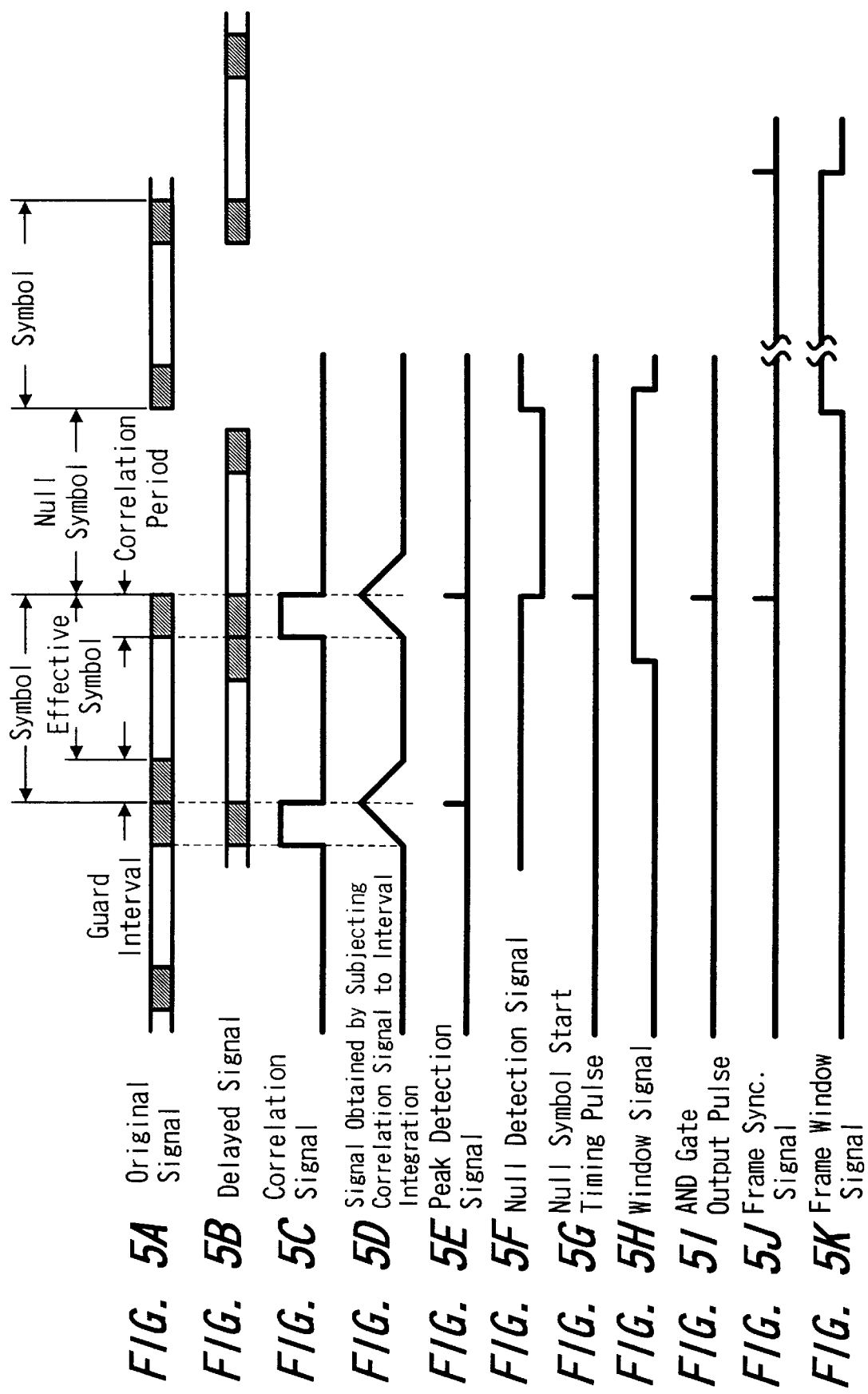

DEMODULATING APPARATUS AND DEMODULATING METHOD

BACKGROUND

1. Field of the Invention

The present invention relates to a demodulating apparatus and a demodulating method for demodulating a digital orthogonal frequency division multiplex modulated signal in which an information signal modulates a plurality of carriers whose frequency components are in an orthogonal relationship with one another.

2. Background of the Invention

As a demodulating apparatus for demodulating a digital orthogonal frequency division multiplex modulated signal in which an information signal modulates a plurality of carriers whose frequency components are in an orthogonal relationship with one another, there is proposed a demodulating apparatus for an OFDM (Orthogonal Frequency Division Multiplex) modulated signal (hereinafter referred to merely as an OFDM modulated signal) which is adopted by a DAB (Digital Audio Broadcasting), etc. taking place in Europe.

According to the OFDM modulation, a modulated signal using a multiplicity of carriers whose frequency components are in an orthogonal relationship with one another, encodes data such as audio data or the like, and the encoded data are allocated to each carrier, thereby modulating each carrier, a digital signal in the frequency domain comprised of each modulated carrier is inverse fast Fourier transformed into a digital signal in a time domain, and the digital signal in the time domain is D/A converted. On its demodulating side, by A/D converting such an OFDM modulated signal and then applying the fast Fourier transform to the A/D converted signal, the encoded data allocated to each carrier is obtained.

In the OFDM modulation used by the DAB, when two bits data is allocated with one of the carriers, each carrier is subjected to a QPSK (Quadrature Phase Shift Keying) modulation, so that this modulation is called an OFDM-QPSK.

In the OFDM modulation, the number of points of the fast Fourier transform corresponds to the number of the carriers and differs depending on a mode according to the DAB standard, i.e. for mode 1 it is 1536, for mode 2, 384, for mode 3, 192 and for mode 4, 68. Therefore, in case of mode 1, for example, it will be possible to transmit data of 2 (bits)×1536=3072 (bits) by the OFDM modulation. This transmissive unit is termed a symbol. In case of modes 1, 2, and 4, a collection of seventy-six symbols is termed a frame. In case of mode 3, a collection of one hundred and fifty-three symbols is termed a frame. Here, a null symbol is not included in the number of symbols in one frame.

Concerning the DAB signal, at present, signals of modes 1, 2, 3 and 4 are known. In the DAB signal, a fundamental period T(=1/2.048 MHz=0.00048828 msec) is defined. Here, a typical DAB signal of mode 1 is shown in FIG. 1. In FIG. 1, both the fundamental period T and a frame are indicated. One frame of the DAB signal of mode 1 is 196608 T (=96 msec) and comprised of one null symbol (symbol number l=0) whose duration is 2656 T (=1.297 msec) and seventy-six subsequent symbols (symbol number l=1~76) whose duration is 2552 T (=1.246 msec).

Each symbol of symbol numbers l=1–76 is comprised of a guard interval at its starting section whose duration is 504 T=246 μsec) and a subsequent effective symbol whose duration is 2048 T (=1 msec). The effective symbol of each symbol of symbol numbers l=1–76 contains multicarriers which number k=1536 and whose frequencies are different from each other. A carrier indicated by zero is the one with the central frequency (a period of that carrier is T). A carrier indicated by 1536/2 (=766) is the one with the highest frequency. A carrier indicated by −1536/2 (=−766) is the one with the lowest frequency. Data amount of one symbol is 1536 waves and, its data amount is 1536×2 bits, i.e. 48 CU (Capacity unit)×64 bits.

Whole symbols of symbol numbers l=1–76 are termed an OFDM symbol.

Taking an example in case of mode 1, the symbol of symbol number l=0 is termed the null symbol and the symbol of symbol number l=1 is termed a TFPR (Time Frequency Phase Reference) symbol, respectively. These two symbols are called a synchronization channel (Sync. Channel). The symbols of symbol numbers l=2~4 are called a FIC (Fast Information Channel) and the whole FIC is divided into twelve FIBs (Fast Information Blocks). The remaining symbols of symbol numbers l=5~76 is divided into four so-called CIFs (Common Interleaved Frames).

Incidentally, the duration of each symbol of the DAB signal differs depending on the mode. The duration of each symbol in mode 2 is ¼ of the duration of each symbol in mode 1. The duration of each symbol in mode 3 is ⅛ of that of each symbol in mode 1. The duration of each symbol in mode 4 is ½ of that of each symbol in mode 1.

In other words, the duration of the symbol except the null symbol is 2552 T (=1.246 msec) for mode 1 as described above. However for mode 2, it is 638 T (=2552 T/4) {=312 μsec (=1.246 msec/4)}. For mode 3, it is 319T (=2552 T/8){=156 μsec (=1.246 msec/8)}. For mode 4, it is 1276 T (=2552 T/2){=623 μsec (=1.246 msec/2)}.

Moreover, the duration T/M of the effective symbol within each symbol except the null symbol is 2048 T (=1 msec) for mode 1 as described above. For mode 2, it is 512 T (=2048 T/4) {=250 μsec (=1 msec/4)}. For mode 3, it is 256 T (=2048 T/8) {=125 μsec (=1 msec/8)}. For mode 4, it is 1024 T (=2048/2) {=500 μsec (=1 msec/2)}.

Furthermore, the duration of the guard interval in the symbol except the null symbol is 504 T (=246 μsec) for mode 1. For mode 2, it is 126 T (=504 T/4) {=61.5 μsec (=246 μsec/4)}. For mode 3, it is 63 T (=504 T/8) {=30.75 μsec (=246 μsec/8)}. For mode 4, it is 252 T(=504 T/2) {=123 μsec (=246 μsec/2)}.

A conventional example of a receiving apparatus (demodulating apparatus) for the DAB signal will now be described below with reference to FIG. 2. A DAB signal (shown in FIG. 3A) from a receiving antenna 1 is supplied to a RF (radio frequency) amplifier/frequency converter/IF (intermediate frequency) amplifier 2 where it is RF amplified, frequency converted and IF amplified for obtaining an OFDM modulated signal of baseband, and the OFDM modulated signal is supplied to an A/D converter 3 where it is converted into a time series of digital data.

The time series of digital data from the A/D converter 3 is supplied to a time synchronizing signal generator 7 which generates a time synchronizing signal for every symbol. The time synchronizing signal is supplied to a fast Fourier transform circuit 4 and a data decoder 5 for controlling the fast Fourier transform timing as well as controlling each circuit in the data decoder 5 to be synchronized.

The intermediate frequency signal from the RF amplifier/frequency converter/IF amplifier 2 is supplied to a null detector (envelope detector circuit) 8 which produces a null detecting signal (see FIG. 3B). This null detecting signal is supplied to a frame synchronizing signal generator 9. The frame synchronizing signal generator 9 is a pulse oscillator which generates the frame synchronizing signal. So, it is necessary to make it synchronized with the null detecting signal (FIG. 3B) of the first or second frame of the DAB signal. Thus, by making the frame synchronizing signal generator 9 synchronized with a starting (falling) edge time point of the null detecting signal, the frame synchronizing signal generator 9 will thereafter issue a frame synchronizing signal (see FIG. 3C) corresponding with the starting time point of the null symbol. The frame synchronizing signal is supplied to the fast Fourier transform circuit 4 in which a frame window signal (FIG. 3D) during a frame period except the null symbol is produced.

The time series of digital data from the A/D converter 3 is supplied to the fast Fourier transform circuit 4 where it is converted into a frequency sequence of digital data. The frequency sequence of digital data from the fast Fourier transform circuit 4 is supplied to the data decoder 5 for decoding and decoded data is output to at an output terminal 6. The data decoder 5 is comprised of a frequency deinterleave circuit, a time deinterleave circuit and an error correcting circuit, which are sequentially cascaded.

In this way, because in the conventional demodulating apparatus (DAB receiver) the frame synchronizing signal generator is synchronized with the null detecting signal, when the starting time point of the null detecting signal deviates greatly from the null symbol of DAB signal due to fading or decrease of S/N ratio of the DAB signal, the frame synchronizing signal from the frame synchronizing signal generator also deviates from the starting time point of the null symbol of DAB signal. As a result, the timing of the frame window signal produced in the fast Fourier transform circuit 4 will deviate from the frame period except the null symbol of DAB signal. If an amount of the deviation is large, it will be impossible to estimate the TFPR (Time Frequency Phase Reference) symbol following the null symbol, and besides, it will be necessary to make the frame synchronizing signal generator 9 synchronized over again.

SUMMARY OF THE INVENTION

In view of the foregoing point, the present invention aims to provide, in a demodulating apparatus comprising a time synchronizing signal generator means for receiving a digital orthogonal frequency division multiplex modulated signal in which an information signal modulates a plurality of carriers whose frequency components are in the orthogonal relationship with one another and for generating a time synchronizing signal synchronized with a symbol forming each frame of the digital orthogonal frequency division multiplex modulated signal, a frame synchronizing signal generator means for generating a frame synchronizing signal synchronized with each frame of the digital orthogonal frequency division multiplex modulated signal and the fast Fourier transform means for receiving the digital orthogonal frequency division multiplex modulated signal, the frame synchronizing signal and the time synchronizing signal and for fast Fourier transforming the digital orthogonal frequency division multiplex modulated signal, where in a demodulated digital information signal may be obtained from the fast Fourier transform means, such one in which, without any influences of the fading or the decrease of S/N ratio of the received digital orthogonal frequency division multiplex modulated signal, the frame synchronizing signal synchronized with high accuracy with each frame of the orthogonal frequency division multiplex modulated signal can be acquired from the frame synchronizing signal generator.

Moreover, the present invention aims to provide, in a demodulating apparatus comprising a time synchronizing signal generator means for receiving the digital orthogonal frequency division multiplex modulated signal in which an information signal modulates a plurality of carriers whose frequency components are in orthogonal relationship with each other and each frame of which is comprised of the null symbol, the synchronization symbol and the plurality of subsequent symbols and for generating a time synchronizing signal synchronized with the symbol forming each frame of the digital orthogonal frequency division multiplex modulated signal, a frame synchronizing signal generator means for generating the frame synchronizing signal synchronized with each frame of the digital orthogonal frequency division multiplex modulated signal, and the fast Fourier transform means for receiving the digital orthogonal frequency division multiplex modulated signal, the frame synchronizing signal and the time synchronizing signal and for fast Fourier transforming the digital orthogonal frequency division multiplex modulated signal to obtain a demodulated digital information signal, and in which a window signal used in the fast Fourier transform means for the synchronization symbol and the plurality of subsequent symbols may be produced on the basis of the frame synchronizing signal, such of that, without any influences of the fading or the decrease of S/N ratio of the received digital orthogonal frequency division multiplex modulated signal, the window signal in fast Fourier transform means synchronized at high accuracy with the synchronization symbol and the plurality of subsequent symbols of each frame can be produced.

Furthermore, the present invention aims to provide, in a demodulating method wherein the basis of time synchronizing signal synchronized with the symbol forming each frame of the digital orthogonal frequency division multiplex modulated signal, the frame synchronizing digital orthogonal frequency division multiplex modulated signal, is generated, and the digital orthogonal frequency division multiplex modulated is fast-Fourier-transformed by using the frame synchronizing signal and the time synchronizing signal to obtain a demodulated digital information signal, such one that without any influences of the fading or the decrease of S/N ratio at the received digital orthogonal frequency division multiplex modulated signal, the frame synchronizing signal synchronized at high accuracy with each frame of the orthogonal frequency division multiplex modulated signal can be acquired from the frame synchronizing generator.

In addition, the present invention aims to provide, in a demodulating method wherein the time synchronizing signal synchronized with the symbol forming each frame of the digital orthogonal frequency division multiplex modulated signal comprising the steps of generating based on the digital orthogonal frequency division multiplex modulated signal in which an information signal modulates a plurality of carriers whose frequency components are in orthogonal relationship with each other and each frame of which is comprised of the null symbol, the synchronization symbol and the plurality of subsequent symbols is generated, the digital frequency division multiplex modulated signal is fast-Fourier-transformed by using the frame synchronizing signal and the time synchronizing signal, and the window signal used in the fast Fourier transform for the synchronization symbol and the plurality of subsequent symbols is generated on the basis of the frame synchronization signal, such that wherein, without any influences at the fading or the fading of S/N ratio of the received digital orthogonal frequency division multiplex modulated signal, the window signal in the fast Fourier transform synchronization symbol and the plurality of subsequent symbols of each frame can be produced.

The present invention provides a demodulating apparatus having a time synchronizing signal generator means for receiving the digital orthogonal frequency division multiplex modulated signal in which an information signal modulates a plurality of carriers whose frequency components are in the orthogonal relationship with each other and for generating a time synchronizing signal synchronized with the symbols forming each frame of the digital orthogonal frequency division multiplex modulated signal, a frame synchronizing signal generator means for generating the frame synchronizing signal synchronized with each frame of the digital orthogonal frequency division multiplex modulated signal, and a fast Fourier transform means for receiving the digital orthogonal frequency division multiplex modulated signal, the frame synchronizing signal and the time synchronizing signal, and for fast Fourier transforming the digital orthogonal frequency division multiplex modulated signal to obtain a demodulated digital information signal from the fast Fourier transform means, wherein, there are provided, correlation detector means for detecting a correlation between a guard section of a symbol of the digital orthogonal frequency division multiplex modulated signal and a section having a correlation with the guard section in an effective symbol of that symbol, a section integrator means for section integrating a detected output by the correlation detector means with respect to the guard section, a peak detector means for detecting a peak of a triangular wave signal from the section integrator means, and a frame timing signal producing means for producing the frame timing signal of a predetermined frame of each of the frames based on the peak detecting signal from the peak detector means, in which the frame synchronizing signal generator means is made synchronized by the frame timing signal from the frame timing signal producing means.

According to a first aspect of the present invention, the correlation between the guard section of the digital orthogonal frequency division multiplex modulated signal and a section having a correlation with the guard section in the effective symbol of that symbol is detected by the correlation detector means. The detected output by the correlation detector means is section integrated with respect to the guard section. A peak of the triangular wave signal from the section integrator means is detected by the peak detector means. The frame timing signal of a predetermined frame of each of the frames is produced by the frame timing signal producing means based on the peak detecting signal from the peak detector means. Thus, the frame synchronizing signal generator means is made synchronized by the frame timing signal from the frame timing

BRIEF DESCRIPTION OF THE DRAWINGS

FIGS. 5A to 5K are timing charts used to explain an operation of the embodiment shown in FIG. 4.

DESCRIPTION OF THE PREFERRED EMBODIMENTS

Figure 1:
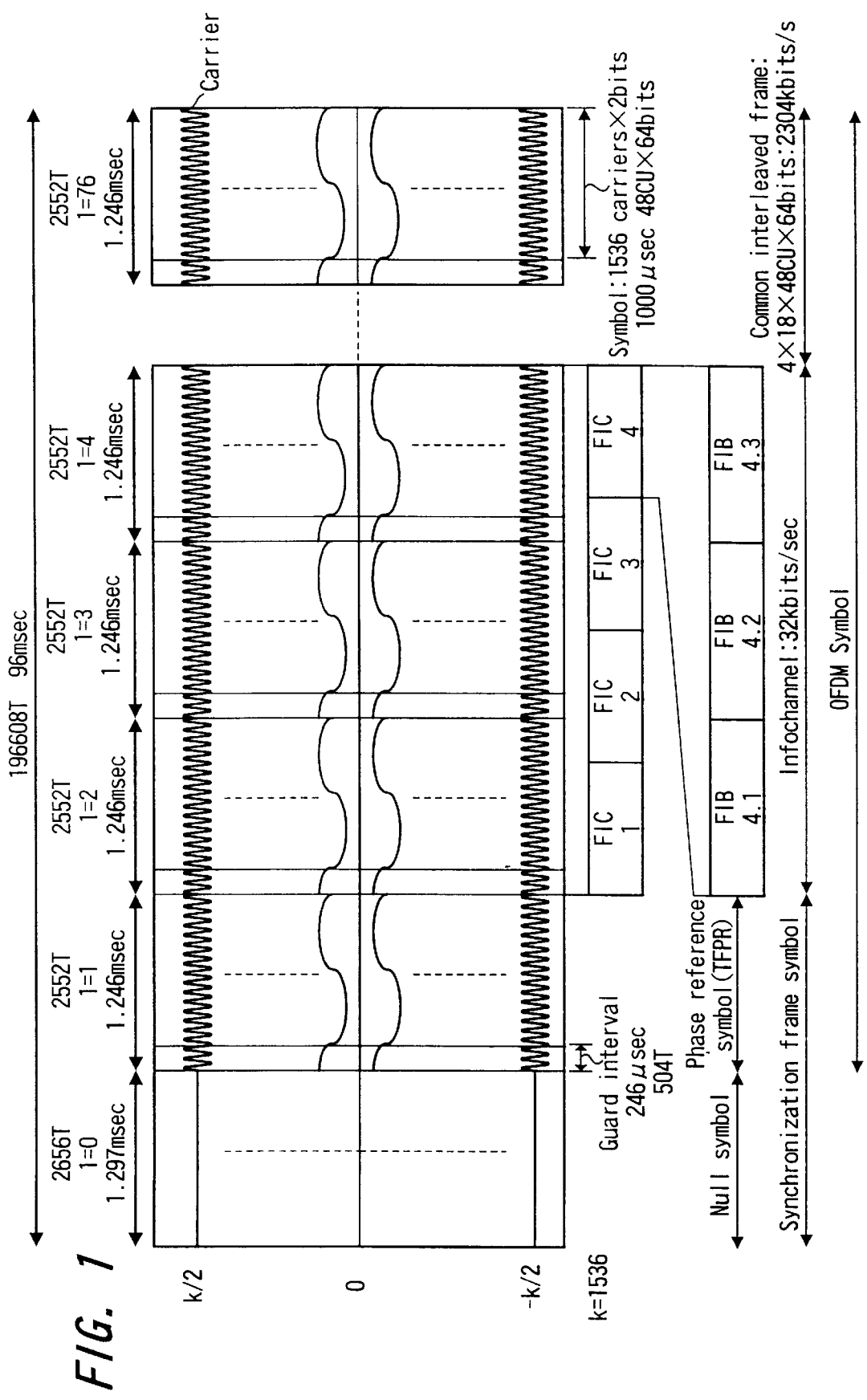
FIG. 1 is a diagram showing a frame arrangement of a mode 1.
Figure 2:
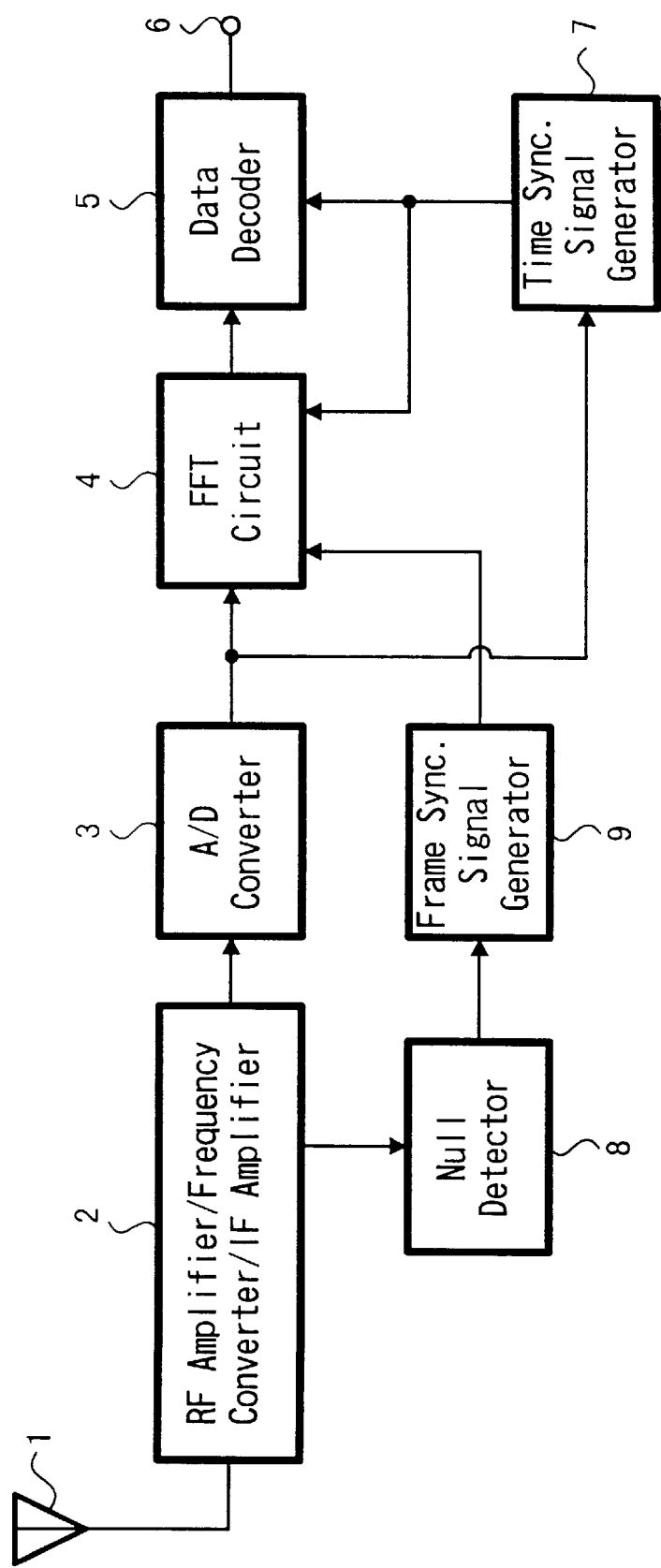
FIG. 2 is a block diagram showing an example of the prior art.
Figure 3:
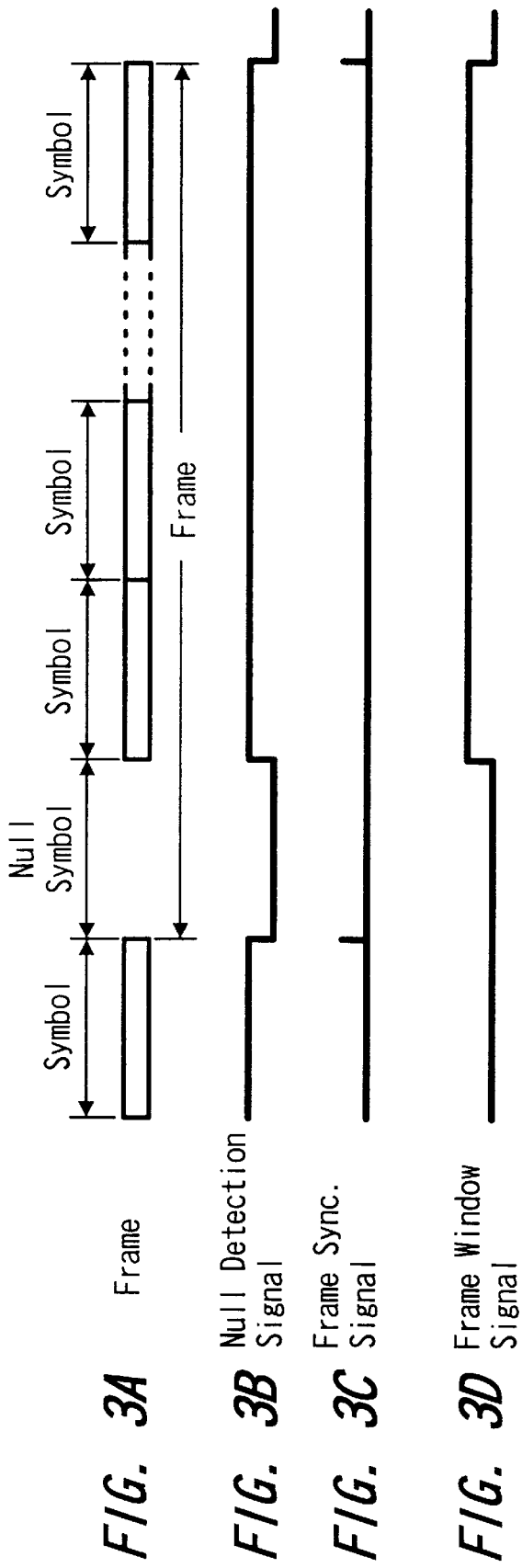
FIGS. 3A to 3D are timing charts used to explain the prior art shown in FIG. 2.
Figure 4:
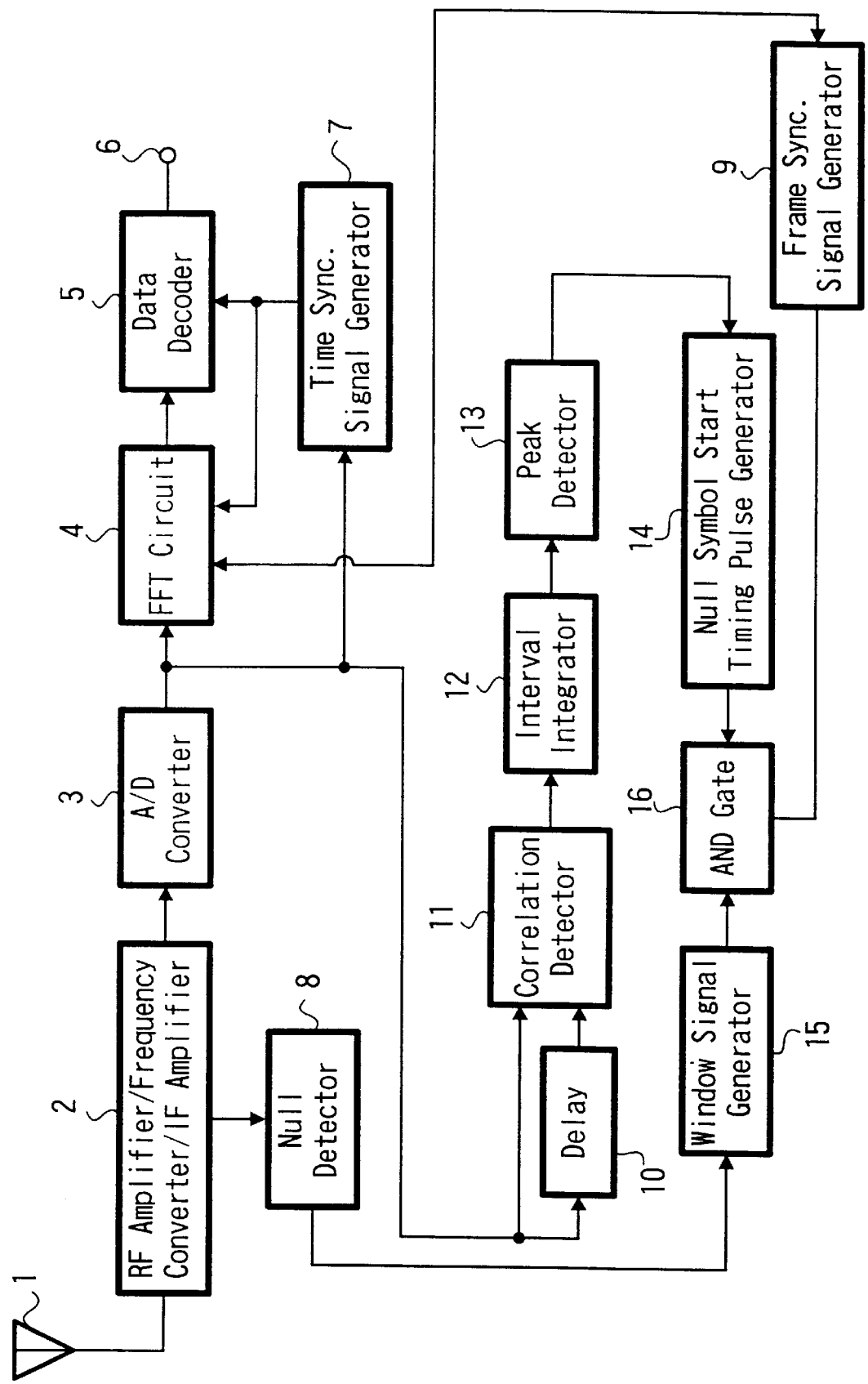
FIG. 4 is a block diagram showing an embodiment of the present invention.

An embodiment of the present invention will now be described below in detail with reference to FIG. 4. In FIG. 4, the parts corresponding to those of FIG. 2 are denoted by the same reference numerals. The received signal from the receiving antenna 1 is supplied to the RF (radio frequency) amplifier/frequency converter/IF (intermediate frequency) amplifier 2, where it is RF amplified, frequency converted and IF amplified, respectively. This will acquire make the OFDM modulated signal at the baseband and the OFDM modulated signal is supplied to the A/D converter 3 which converts it into the time series of digital data.

The time series of digital data from the A/D converter 3 is supplied to the fast Fourier transform circuit 4, where it is transformed into the frequency sequence of digital data. The frequency sequence of digital data from the fast Fourier transform circuit 4 is supplied to the data decoder 5 for decoding and the decoded data is output on the output terminal 6. The data decoder 5 is made up of the frequency deinterleave circuit, the time deinterleave circuit and the error correction circuit which are sequentially cascaded.

The time sequence of digital data from the A/D converter 3 is supplied to the time synchronizing signal generator 7 and the time synchronizing signal obtained therefrom at the symbol of each frame is supplied to the fast Fourier transform circuit 4 and to the data decoder 5 for controlling the fast Fourier transform timing as well as controlling each circuit in the data decoder 5 for synchronization.

The intermediate frequency signal from the RF amplifier/frequency converter /IF amplifier 2 is supplied to the null detector (envelope detector circuit) 8 for obtaining the null detecting signal (see FIG. 5F). The null detecting signal is supplied to a window signal generator 15 for generating a window signal (see FIG. 5H) which has one period (high level time period) including zero (low level) time period of the null detecting signal in FIG. 5F and spreading the zero time period before and after the same.

As is shown in FIG. 5A, each symbol in a frame of the digital data from the D/A converter 2 is comprised of the guard interval (guard section) in its head portion and the subsequent effective symbol. Furthermore, in the last portion of the effective symbol is provided a correlation period of time having a correlation with the guard interval in the same length of time as that of the guard interval.

The digital data from the A/D converter 3 (FIG. 5A) is supplied directly to a correlation detector 11 and also to a delay device 10 having a time delay corresponding to a time period of the effective symbol. The delayed digital data (FIG. 5B) is supplied to the correlation detector 11 which detects a correlation between the two digital data. Further, the correlation detection is carried out by multiplying the original signal and the delayed signal together. By doing so, a correlation signal (FIG. 5C) which goes to a high level during a period corresponding to the correlation period of the original signal and the guard interval of the delayed signal is output from the correlation detector 11.

The correlation signal from the correlation detector 11 is supplied to a section integrator 12 where it is integrated with respect to the guard interval. The section integrated signal of the correlation signal is, as shown in FIG. 5D, a triangular wave signal of line symmetry, which has a rising inclination during the correlation signal period and a falling inclination after completion of the correlation signal.

The section integrated signal is supplied to a peak detector 13 for peak detection, and a peak detecting signal (FIG. 5E) indicative of a starting or finishing time of the symbol is output. The peak detecting signal is supplied to a null symbol start timing pulse generator 14 where a null symbol start timing pulse (FIG. 5G) of the first or second frame of the DAB signal is produced. The null symbol start timing pulse is a timing signal which is calculated from peak detecting signal and output by the timing pulse generator 14, and whose timing coincides with a starting timing of the null detecting signal. However, when the phase of the null detecting signal goes out of coincidence with the null symbol period due to the fading or the decrease of S/N ratio of the received signal or the like, the null symbol start timing pulse will not coincide with the starting timing of the null detecting signal.

And then, the window signal (FIG. 5H) from the window signal generator 15 and the null symbol start timing pulse (FIG. 5G) are both supplied to an AND gate 16 which outputs an AND gate output pulse (FIG. 5I). The AND gate output pulse is supplied to the frame synchronizing signal generator 9 which is thereby made synchronized (FIG. 5J). Thereafter, the frame synchronizing signal (FIG. 5J) synchronized with the null symbol start timing pulse will be generated. The frame synchronizing signal is supplied to the fast Fourier transform circuit 4 in which a frame window signal (FIG. 5K) corresponding to a time period excepting the null symbol period from the frame period is produced.

According to the first aspect of the present invention, in the demodulating apparatus comprising the time synchronizing signal generator means for receiving the digital orthogonal frequency division multiplex modulated signal in which an information signal modulates a plurality of carriers whose frequency components are in the orthogonal relationship with each other and for generating the time synchronizing signal synchronized with the symbol forming each frame of the digital orthogonal frequency division multiplex modulated signal, the frame synchronizing signal generator means for generating the frame synchronizing signal synchronized with each frame of the digital orthogonal frequency division multiplex modulated signals and the fast Fourier transform means for receiving the digital orthogonal frequency division multiplex modulated signal, the frame synchronizing signal and the time synchronizing signal and for fast Fourier transforming the digital orthogonal frequency division multiplex modulated signal to obtain a demodulated digital information signal from the fast Fourier transform means, because there are provided the correlation detector means for detecting the correlation between the guard section of the symbol of the digital orthogonal frequency division multiplex modulated signal and a section having a correlation with the guard section in the effective symbol of that symbol, the section integrator means for section integrating the detected output of the correlation detector means with respect to the guard section, the peak detector means for detecting a peak of the triangular wave signal from the section integrator means and the frame timing signal producing means for producing the frame timing signal of the predetermined frame of each of the frames based on the peak detecting signal from the peak detector means, and the frame synchronizing signal generator means may be made synchronized by the frame timing signal from the frame timing signal producing means, it is possible to provide a demodulating apparatus in which the frame synchronizing signal synchronized at high accuracy with each frame of the orthogonal frequency division multiplex modulated signal can be obtained from the frame synchronizing generator, without any influences of the fading or the decrease of S/N ratio of the received digital orthogonal frequency division multiplex modulated signal.

According to the second aspect of the present invention, in the demodulating apparatus comprising the time synchronizing signal generator means for the digital orthogonal frequency division multiplex modulated signal in which an information signal modulates a plurality of carriers whose frequency components are in the orthogonal relationship with each other and each frame of which is comprised of the null symbol, the synchronization symbol and the plurality of subsequent symbols, and for generating the time synchronizing signal synchronized with the symbol forming each frame of the digital orthogonal frequency division multiplex modulated signal, the frame synchronizing signal generator means for generating the frame synchronizing signal synchronized with each frame of the digital orthogonal frequency division multiplex modulated signal, and the fast Fourier transform means for receiving the digital orthogonal frequency division multiplex modulated signal, the frame synchronizing signal and the time synchronizing signal and for fast Fourier transforming the digital orthogonal frequency division multiplex modulated signal to obtain the demodulated digital information signal in which the window signal used in the fast Fourier transform means for the synchronization symbol and the plurality of subsequent symbols may be produced based on the frame synchronizing signal, because there are provided the correlation detector means for detecting the correlation between the guard section of the symbol of the digital orthogonal frequency division multiplex modulated signal and the section having a correlation with the guard section in the effective symbol of that symbol, the section integrator means for section integrating the detected output of the correlation detector means with respect to guard section, the peak detector means for detecting the peak of the triangular wave signal from the section integrator means, and the frame timing signal producing means for producing the frame timing signal of the predetermined frame of each of the frames based on the peak detecting signal from the peak detector means are provided, and the frame synchronizing signal generator means may be synchronized by the frame timing signal from the timing signal producing means, it is possible to provide a demodulating apparatus in which the window signal used in the fast Fourier transform means synchronized at high accuracy with the synchronization symbol and the plurality of subsequent symbols of each frame can be produced, without any influence of the fading or the decrease of S/N ratio of the received digital orthogonal frequency division multiplex modulated signal.

According to the third aspect of the present invention, in the demodulating method in which, based on the digital orthogonal frequency division multiplex modulated signal wherein the information signal modulates the plurality of carriers whose frequency components are in the orthogonal relationship with each other, the time synchronizing signal synchronized with the symbols forming each frame of the digital orthogonal frequency division multiplex modulated signal is generated, generating the frame synchronizing signal synchronized with each frame of the digital orthogonal frequency division multiplex modulated signal is generated, and the digital orthogonal frequency division multiplex modulated signal is fast Fourier transformed by using the frame synchronizing signal and the time synchronizing signal to obtain the demodulated digital information signal, because the correlation between the guard section of the symbol of the digital orthogonal frequency division multiplex modulated signal and the section having a correlation with the guard section in the effective symbol of that symbol is detected, the detected output on the correlation is section integrated with respect to the guard section, a peak of the triangular wave signal which is the section integrated output is detected, the frame timing signal of the predetermined frame of each of the frames is produced based on the peak detecting signal, and the frame synchronizing signal is made synchronized by the produced frame timing signal, it is possible to provide a demodulating method in which the frame synchronizing signal synchronized at high accuracy with each frame of the orthogonal frequency division multiplex modulated signal can be acquired from the frame synchronizing signal generator, without any influences of the fading or the decrease of S/N ratio of the received digital frequency division multiplex modulated signal.

According to the fourth aspect of the present invention, in the demodulating method in which based on the digital frequency orthogonal frequency division multiplex modulated signal in which an information signal modulates the plurality of carriers whose frequency components are in the orthogonal relationship with each other and each frame of which is comprised of the null symbol, the synchronization symbol and the plurality of subsequent symbols, the time synchronizing signal synchronized with the symbols forming each frame of the digital orthogonal frequency division multiplex modulated signal is generated, generating the frame synchronizing signal synchronized with each frame of the digital orthogonal frequency division multiplex modulated signal is generated, the digital orthogonal frequency division multiplex modulated signal is fast Fourier transformed by using the frame synchronizing signal and the time synchronizing signal, and the window signal used in the fast Fourier transform for the synchronization symbol and the plurality of subsequent symbols is generated on the basis of the frame synchronizing signal, because the correlation between the guard section of the symbol of the digital orthogonal frequency division multiplex modulated signal and the section having a correlation with the guard section in the effective symbol of that symbol is detected, the detected output on the correlation is section integrated with respect to the guard section, a peak of the triangular wave signal which is the section integrated output is detected, the frame timing signal of the predetermined frame of each of the frames is produced based on the peak detecting signal, and the frame synchronizing signal is made synchronized by the frame timing signal, it is possible to provide a demodulating method in which the window signal used in the fast Fourier transform means, synchronized at high accuracy with the synchronization symbol of each frame and the plurality of subsequent symbols can be generated, without any influences of the fading or the decrease of S/N ratio of the received digital orthogonal frequency division multiplex modulated signal.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A demodulating apparatus having time synchronizing signal generator means for receiving a digital orthogonal frequency division multiplex modulated signal in which an information signal modulates a plurality of carriers having respective frequency components in an orthogonal relationship with each other and for generating a time synchronizing signal synchronized with a symbol forming each frame of said digital orthogonal frequency division multiplex modulated signal, frame synchronizing signal generator means for generating a frame synchronizing signal synchronized with each frame of said digital orthogonal frequency division multiplex modulated signal, and fast Fourier transform means for receiving said digital orthogonal frequency division multiplex modulated signal, said frame synchronizing signal, and said time synchronizing signal and for fast Fourier transforming the digital orthogonal frequency division multiplex modulated signal, so that a demodulated digital information signal may be obtained from said fast Fourier transform means, comprising:

correlation detector means for detecting a correlation between a guard section of said symbol of said digital orthogonal frequency division multiplex modulated signal and a section having a correlation with said guard section in an effective symbol of said symbol;

section integrator means for section integrating a detected output of said correlation detector means with respect to said guard section;

peak detector means for detecting a peak of a triangular wave signal output from said section integrator means; and frame timing signal producing means for producing a frame timing signal of a predetermined frame of each of said frames based on a peak detecting signal from said peak detector means, wherein said frame synchronizing signal generator means is synchronized by a frame timing signal from said frame timing signal producing means.

2. A demodulating apparatus having time synchronizing signal generator means for receiving a digital orthogonal frequency division multiplex modulated signal in which an information signal modulates a plurality of carriers having respective frequency components in an orthogonal relationship with each other and each frame of which is comprised of a null symbol, a synchronization symbol and a plurality of subsequent symbols and for generating a time synchronizing signal synchronized with a symbol forming each of said frames of said digital orthogonal frequency division multiplex modulated signal, frame synchronizing signal generator means for generating a frame synchronizing signal synchronized with each frame of said digital orthogonal frequency division multiplex modulated signal, and fast Fourier transform means for receiving said digital orthogonal frequency division multiplex modulated signal, said frame synchronizing signal, and said time synchronizing signal and for fast Fourier transforming said digital orthogonal frequency division multiplex modulated signal to thereby produce a demodulated signal information signal, in which a window signal used in said fast Fourier transform means for said synchronization symbol and said plurality of subsequent symbols is based on the frame synchronizing signal, comprising:

correlation detector means for detecting a correlation between a guard section of said symbol of said digital orthogonal frequency division multiplex modulated signal and a section having a correlation with the guard section in an effective symbol of that symbol;

section integrator means for section integrating a detected output of said correlation detector means with respect to said guard section;

peak detector means for detecting a peak of a triangular wave signal output from said section integrator means; and frame timing signal producing means for producing a frame timing signal of a predetermined frame of each of said frames based on a peak value detected signal from said peak detector means, wherein said frame synchronizing signal generator means is synchronized by said frame timing signal from said frame timing signal producing means.

3. A demodulating method in which, based on a digital orthogonal frequency division multiplex modulated signal in which an information signal modulates a plurality of carriers having respective frequency components in an orthogonal relationship with each other, a time synchronizing signal synchronized with a symbol forming each frame of said digital orthogonal frequency division multiplex modulated signal is generated, a frame synchronizing signal synchronized with each frame of said digital orthogonal frequency division multiplex modulated signal is generated, and said digital orthogonal frequency division multiplex modulated signal is fast Fourier transformed by using said frame synchronizing signal and said time synchronizing signal into a demodulated signal information signal, comprising the steps of:

- detecting a correlation between a guard section of a symbol of said digital orthogonal frequency division multiplex modulated signal and a section having a correlation with the guard section in an effective symbol of that symbol;
- section-integrating the correlation detecting output with respect to the guard section;
- detecting a peak of a triangular wave signal output from the section integrating step;
- generating a frame timing signal of a predetermined frame of each of said frames based on the peak detected in said detecting step; and
- making the frame synchronizing signal synchronized by the generated frame timing signal.

4. A demodulating method in which a time synchronizing signal synchronized with a symbol forming each frame of a digital orthogonal frequency division multiplex modulated signal is generated, based on a digital frequency orthogonal division multiplex modulates signal in which an information signal modulates a plurality of carriers having respective frequency components in an orthogonal relationship with each other and each frame of which is comprised of a null symbol, a synchronization symbol, and a plurality of subsequent symbols, a frame synchronizing signal synchronized with each frame of said digital orthogonal frequency division multiplex modulated signal is generated, and the digital orthogonal frequency division multiplex modulated signal is fast Fourier transformed by using said frame synchronizing signal and said time synchronizing signal, whereby a window signal used in said fast Fourier transform for said synchronization symbol and said plurality of subsequent symbols is based on said frame synchronizing signal, comprising the steps of:

- detecting a correlation between a guard section of said symbol of said digital orthogonal frequency division multiplex modulated signal and a section having a correlation with said guard section in an effective symbol of said symbol;
- section integrating the correlation detecting output with respect to the guard section;
- detecting a peak of a triangular wave signal output from the section integrating step;
- generating a frame timing signal of a predetermined frame of each of said respective frames based on said peak detected in said detecting step; and
- making said frame synchronizing signal synchronized by said frame timing signal output from the step of generating.

\* \* \* \* \*